United States Patent

Kashiwase

[11] Patent Number: 5,957,799
[45] Date of Patent: Sep. 28, 1999

[54] AUTOMATIC TRANSMISSION

[75] Inventor: Hajime Kashiwase, Tokyo, Japan

[73] Assignee: Fuji Jukogyo Kabushiki Kaisha, Tokyo, Japan

[21] Appl. No.: 09/123,206

[22] Filed: Jul. 27, 1998

[30] Foreign Application Priority Data

Aug. 12, 1997  [JP]  Japan .................................. 9-217870

[51] Int. Cl.⁶ ................................................ F16H 61/38
[52] U.S. Cl. ................................................................ 475/47
[58] Field of Search ........................................ 475/47, 59

[56] References Cited

U.S. PATENT DOCUMENTS

| 4,018,106 | 4/1977 | Uozumi et al. | 475/47 |
| 4,382,393 | 5/1983 | Bowen | 475/47 |
| 5,334,112 | 8/1994 | Nogle et al. | 475/59 |
| 5,700,219 | 12/1997 | Ohkubo | 475/47 |

FOREIGN PATENT DOCUMENTS 61-105333  5/1986  Japan .

*Primary Examiner*—Dirk Wright
*Attorney, Agent, or Firm*—Martin A. Farber

[57] ABSTRACT

An automatic transmission comprises a torque converter, a torque converter case for accommodating the torque converter, a transmission, an input shaft for connecting the torque converter with the transmission, a forward and reverse changeover apparatus including a planetary gear, a planetary carrier and a reverse brake, comprising, a forward clutch drum connected with the input shaft, a forward clutch plate provided between the forward clutch drum and the planetary carrier, a lock-up clutch drum connected with the torque converter case, a lock-up clutch plate provided between the forward clutch drum and the lock-up clutch drum, a lock-up clutch piston slidably fitted to the input shaft for engaging and releasing the lock-up clutch plate and provided inside of said forward clutch drum between the forward clutch drum and the forward and reverse changeover apparatus, a forward clutch piston slidably fitted to the input shaft for engaging and releasing the forward clutch plate and provided inside of the forward clutch drum between the lock-up clutch piston and the forward and reverse changeover apparatus, a first pressure chamber provided between the forward clutch piston and the lock-up clutch piston for operating the forward clutch piston, and a second pressure chamber provided between the lock-up clutch piston and the forward clutch drum for operating the lock-up clutch piston.

9 Claims, 6 Drawing Sheets

AUTOMATIC TRANSMISSION

BACKGROUND OF THE INVENTION

1. Field of the Invention

The present invention relates to an automatic transmission and more particularly to a continuously variable automatic transmission whose overall width is shortened so as to be accommodated in a limited space of an engine room.

2. Prior Arts

In general, a continuously variable automatic transmission used for a motor vehicle comprises a continuously variable transmission which is a main transmission mechanism for controlling vehicle speeds during normal operation, a starting apparatus for controlling power transmission of an engine and transmission during the vehicle starting period, and a forward and reverse changeover apparatus for changing over from forward to reverse running.

The starting apparatus described herein has a function of a clutch for transmitting power from the engine to the transmission smoothly when the vehicle starts to move from a standstill condition.

For example, Japanese Patent Application Laid-open No. Toku-Kai-Shou 61-105333 discloses a continuously variable automatic transmission using a torque converter as a starting apparatus, as shown in FIG. 5.

When the engine starts, the driving force of the engine 10 is transmitted to a pump impeller 2c incorporated in a torque converter 2b through a torque converter case 2a provided in the starting apparatus 2. Then, the pump impeller 2c drives a turbine runner 2d via working fluid and at the same time drives an oil pump 2e.

Further, there is provided with a forward and reverse changeover apparatus 4 between the starting apparatus 2 and a continuously variable transmission 3 and an output shaft 2f connected with the turbine runner 2d is interconnected with a forward clutch 4a.

During forward running, the forward clutch 4a is engaged to transmit the driving force to a primary pulley 3a through the forward clutch 4a.

On the other hand, during reverse running, the forward clutch 4a is released and at the same time a reverse brake 4b is engaged to fix the rotation of a ring gear 4d of the planetary gear 4c. As a result, a sun gear connected with the primary pulley 3a of the continuously variable transmission 3 is rotated reversely at reduced speeds through a planetary pinion connected with a planetary carrier 4f which is connected integrally with a clutch drum 4e of the forward clutch 4a to rotate the primary pulley 3a reversely.

The starting apparatus 2 includes a lock-up clutch 2g for transmitting the engine power at the normal running directly to the output shaft 2f of the torque converter 2b without going through working fluid. The engagement and disengagement of the lock-up clutch 2g is controlled by a lock-up piston 2h.

In the torque converter case 2a, a so-called "apply chamber" 2j is formed on the left side of the lock-up piston 2h and a so-called "release chamber" 2k is formed on the right side thereof. When the working fluid supplied to the release chamber 2k flows into the apply chamber 2j, the lock-up piston 2h is moved to the left by the pressure difference between the release chamber 2k and the apply chamber 2j and the lock-up clutch 2g is disengaged to obtain the coupling condition of the torque converter 2b. The working fluid flowing into the apply chamber 2j goes to the drain side after lubricating and cooling the torque converter 2b.

Further, when the working fluid is supplied to the apply chamber 2j, since the working fluid is drained through the release chamber 2k, the pressure difference is generated between the apply chamber 2j and the release chamber 2k, thereby the lock-up piston 2h is moved to the right and the lock-up clutch 2g is engaged to obtain the lockup condition.

The engagement and disengagement of the lock-up clutch 2g must be performed swiftly under any running conditions. Further, in general, the lock-up clutch 2g is engaged preferably at low speeds of the engine in order to enhance the power transmission efficiency. However, when the lock-up clutch 2g is engaged at the low speed area of the engine, the fluctuation of the engine speed is likely to increase especially in case of a small speed reduction ratio or the power train and the vehicle body may cause severe vibrations and noises due to a resonance at a particular rotational speed range.

Generally, the power transmission from the lock-up clutch 2g to the output shaft 2f of the torque converter is performed by way of a damper unit 2i. In order to absorb fluctuations of the engine rotational speed effectively, it is necessary to increase the damper unit in size. The increase of size incurs not only an increase of manufacturing cost but also an up-sizing of the starting apparatus 2 due to an enlarged damper unit.

There is a known technique in which when the engine torque is short, a part of the driving force is transferred to the torque converter 2b by causing slips in the lock-up clutch 2g to reduce vibrations and noises.

Since the lock-up clutch 2g is operated by the relatively large amount of working fluid which flows between the apply chamber 2j and the release chamber 2k, further since this flow of the working fluid is controlled by changing over hydraulic circuits provided in the apply chamber 2j and the release chamber 2k, respectively, it is difficult to make a fine control with respect to the changeover timing of these hydraulic circuits and the pressure of the working fluid. Therefore, as far as the lock-up clutch 2g is controlled by the hydraulic circuits shared with other hydraulic circuits of the transmission, it is difficult to achieve a stable and accurate slip control in engaging or disengaging the lock-up clutch.

Accordingly, in order to obtain a lock-up control apparatus having a quick response and an accurate operation, it is desirable to incorporate a dedicated independent hydraulic circuit for the slip control. However, generally, providing a dedicated hydraulic circuit is impracticable due to not only the complication of hydraulic circuits but also an increase of the manufacturing cost.

Therefore, in order to achieve a practicable independent hydraulic circuit, the construction of the dedicated hydraulic circuit should be as simple as possible.

FIG. 6 is an example of the case where the engine 10 and the transmission 1 are arranged transversely, in which the overall width Ws of the engine 10 and the transmission 1 must be a size to be able to be accommodated in an engine room 6a.

Recent motor vehicles are equipped with a frame 7 in the engine room 6a for absorbing an impact on both sides of the vehicle in case the vehicle has a collision from the lateral direction. Further, a front tire 8 is arranged outside of the frame 7.

The frame 7 must have a sectional area sufficient to provide rigidity for safety and further the front tire 8 is required to move within as large steering angle as possible in order to obtain a small turning circle radius.

As a result of this, a space for accommodating the engine 10 and the transmission 1 in the engine room 6a tends to become small, therefore the overall width Ws including the engine 10 and the transmission 1 must be shortened as far as possible.

However, in the continuously variable automatic transmission 1 of the prior art, since the starting apparatus 2 and the forward and reverse changeover apparatus 4 are arranged between the engine 10 and the continuously variable transmission 3 according to the order of the transmission of power, it is technically difficult to shorten the width Wt of the continuously variable automatic transmission 1. Several means such as making a pulley ratio of the continuously variable transmission small, reducing the width of a belt wound around both pulleys, making walls thin, making clearances between components small and the like can be considered. However, any of these means may adversely affect the function of the continuously variable automatic transmission 1 or reduce rigidity and strength of the transmission.

As a result of this, it is difficult to incorporate these techniques for shortening the width of the automatic transmission 1 and further one or more other techniques for enhancing the responsibility and control performance of the lock-up control into the automatic transmission.

SUMMARY OF THE INVENTION

In view of the aforementioned disadvantages of the prior arts, it is an object of the present invention to provide a continuously variable automatic transmission having a short width so as to be able to be accommodated in a narrow engine room and it is another object of the present invention to provide a continuously variable transmission capable of enhancing the responsibility and control performance at the lock-up control with a compactness retained.

In order to attain the objects mentioned above, the automatic transmission according to the present invention comprises a torque converter, a torque converter case for accommodating the torque converter, a transmission, an input shaft for connecting the torque converter with the transmission, a forward and reverse changeover apparatus including a planetary gear, a planetary carrier and a reverse brake, comprising, a forward clutch drum connected with the input shaft, a forward clutch plate provided between the forward clutch drum and the planetary carrier, a lock-up clutch drum connected with the torque converter case, a lock-up clutch plate provided between the forward clutch drum and the lock-up clutch drum, a lock-up clutch piston slidably fitted to the input shaft for engaging and releasing the lock-up clutch plate and provided inside of the forward clutch drum between the forward clutch drum and the forward and reverse changeover apparatus, a forward clutch piston slidably fitted to the input shaft for engaging and releasing the forward clutch plate and provided inside of the forward clutch drum between the lock-up clutch piston and the forward and reverse changeover apparatus, a first pressure chamber provided between the forward clutch piston and the lock-up clutch piston for operating the forward clutch piston, and a second pressure chamber provided between the lock-up clutch piston and the forward clutch drum for operating the lock-up clutch piston.

DESCRIPTION OF THE DRAWINGS

By way of example only, an embodiment of the present invention will now be described, with reference to the accompanying drawings, in which.

DETAILED DESCRIPTION OF THE INVENTION

Figure 1:
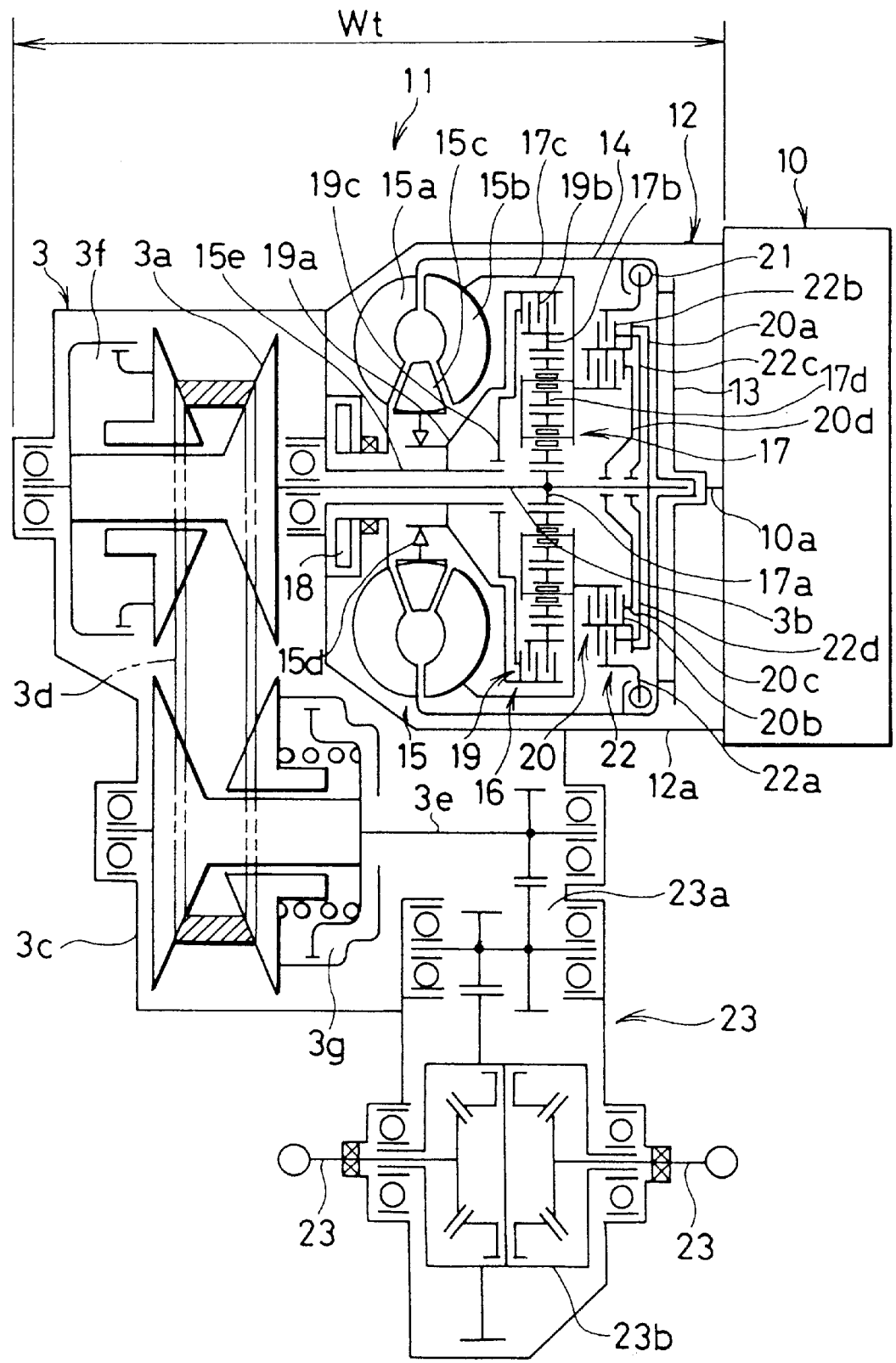
FIG. 1 is a schematic view showing an automatic transmission according to a first embodiment of the present invention.

Referring now to FIG. 1, reference numeral 11 denotes a continuously variable automatic transmission incorporating a starting apparatus 12 and a continuously variable transmission 3 therein. Further, the continuously variable automatic transmission 11 is integrally coupled on the input side thereof with an engine 10.

The starting apparatus 12 has a fixed plate 13 connected with a crank shaft 10a of the engine 10 and further this fixed plate 13 is connected with a pump impeller 15a of a torque converter 15 through a torque converter case 14 for accommodating the torque converter 15. The torque converter case 14 is connected with a case for accommodating the continuously variable transmission 3.

The torque converter 15 comprises the pump impeller 15a, a turbine runner 15b driven by the pump impeller 15a via working fluid and a stator 15c for straightening the stream of the working fluid. The stator 15c is connected through a one-way clutch 15d with a stator shaft 15e which is directly or indirectly fixed to a body case 12a. Numeral 18 denotes an oil pump driven by the pump impeller 15a directly. Further, numeral 16 denotes a forward and reverse changeover apparatus which is accommodated in the torque converter case 14. The forward and reverse changeover apparatus 16 comprises a planetary gear 17, a reverse brake 19 and a forward clutch 20.

The planetary gear 17 is disposed adjacent to the turbine runner 15b of the torque converter 15. The planetary gear 17 includes a sun gear 17a which is connected with or formed integrally with a pulley input shaft 3b extended from a primary pulley 3a. Further, the planetary gear 17 includes a ring gear 17b and a case 19a for mounting the reverse brake 19 is disposed on the outer periphery of the ring gear 17b. The case 19a is connected with the body case 12a through the stator shaft 15e. Further, there is provided with brake plates 19b between the case 19a and the ring gear 17b.

Further, the case 19a is provided between the planetary gear 17 and the turbine runner 15b and its center is fixed to the stator shaft 15e. Further, a brake piston 19c for engaging and disengaging the brake plates 19b is provided between the case 19a and the planetary gear 17 with its center fitted to the stator shaft 15e.

Further, a planetary carrier 17c provided in the planetary gear 17 holds a planetary pinion 17d in such a way that it encloses the brake piston 19c therein. Further, the planetary carrier 17c is connected with the turbine runner 15b in such away that it overhangs the case 19a from outside. Further, a part of the planetary carrier 17c is extended towards the fixed plate 13.

This extended part of the planetary carrier 17c is opposite to a forward clutch drum 20a of the forward clutch 20. The forward clutch drum 20a is provided on the opposite side of the fixed plate 13 through the torque converter case 14 and is connected with the pulley input shaft 3b. Further, the forward clutch drum 20a is rotatably supported by the torque converter case 14 through a thrust bearing 26.

In the forward clutch drum 20a, a forward clutch piston 20c is incorporated. Further, between the forward clutch piston 20c and the forward clutch drum 20a, a lock-up clutch piston 22c of a lock-up clutch 22 is provided.

Figure 2:
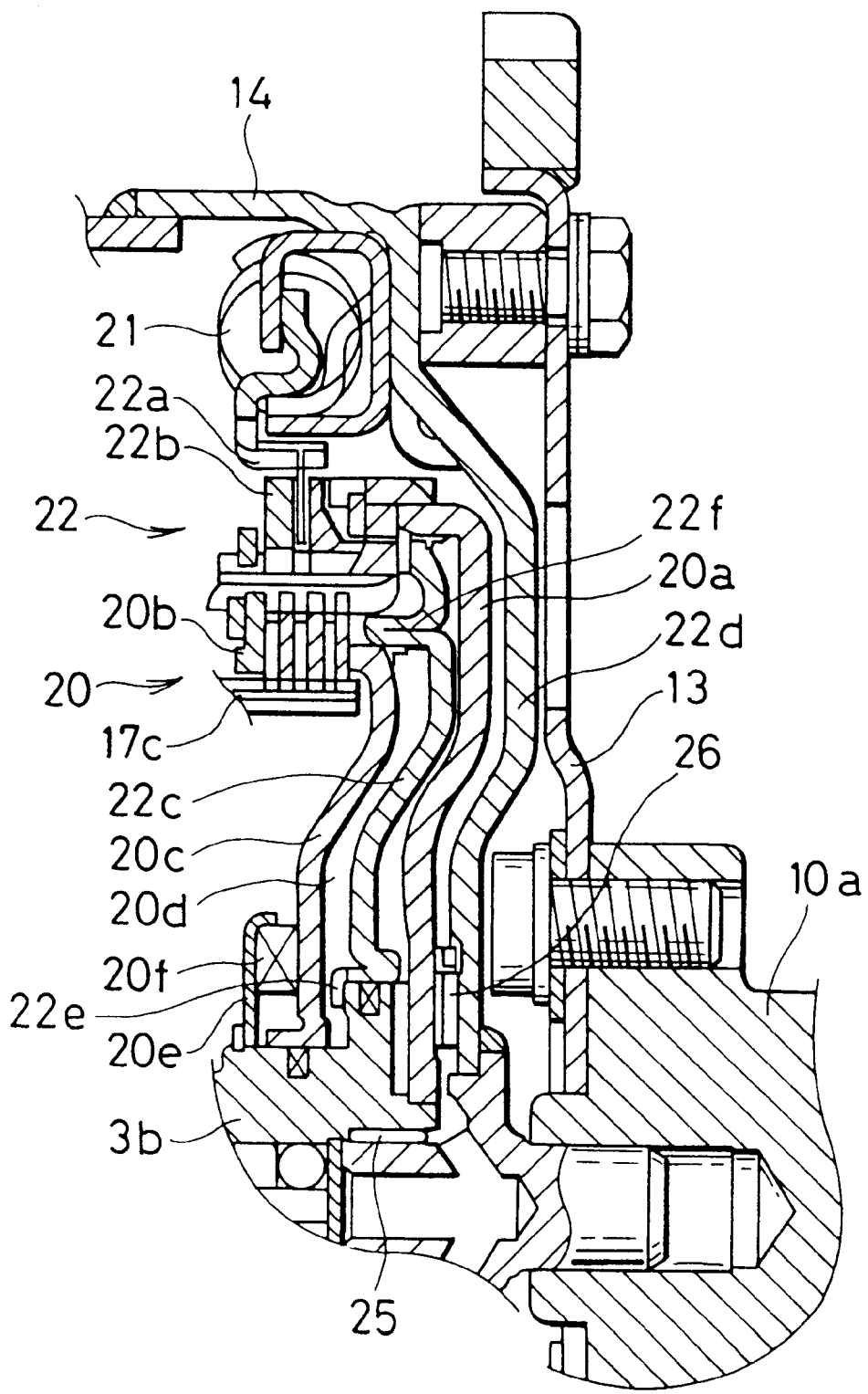
FIG. 2 is an enlarged fragmentary sectional view showing an operating mechanism of a lock-up clutch according to a first embodiment.

The forward clutch piston 20c is for engaging and disengaging a forward clutch plate 20b which is provided between the extended part of the planetary carrier 17c and the inner periphery of the forward clutch drum 20a and its center axis is fitted slidably in the axial direction to the pulley input shaft 3b through a sealing member. Further, a spring retainer 20e is fixed to the pulley input shaft 3b on the left side of the forward clutch piston 20c to receive the force applied to the forward clutch piston 20c, as shown in FIG. 2. Further there is provided with a return spring 20f for biasing the forward clutch piston 20c to the right hand direction in FIG. 2.

On the other hand, the lock-up clutch piston 22c is for engaging and disengaging a lock-up clutch plate 22b which is provided between the outer periphery of the forward clutch drum 20a and a lock-up clutch drum 22a of the lock-up clutch 22 and its center axis is fitted slidably in the axial direction to the pulley input shaft 3b through a sealing member.

As shown in FIG. 2, the traveling of the lock-up clutch piston 22c in the right hand direction is restricted by a stopper 22e. Further, the lock-up clutch piston 22c has a folded portion 22f near the lock-up clutch drum 22a and the folded portion 22f is fitted slidably in the axial direction to the outer periphery of the forward clutch piston 20c through a sealing member. Further, the lock-up clutch piston 22c is fitted slidably in the axial direction at the upper end thereof to the inner periphery of the forward clutch drum 20a through a sealing member.

As a result, the space between the forward clutch drum 20a and the forward clutch piston 20c is divided into two chambers by the lock-up clutch piston 22c. The first chamber is a forward clutch operating chamber 20d formed between the lock-up clutch piston 22c and the forward clutch piston 20c and the second chamber is a lock-up operating chamber 20d formed between the forward clutch drum 20a and the lock-up clutch piston 22c.

The outer periphery of the forward clutch drum 20a is opposite to the lock-up clutch drum 22a which is connected through a damper unit 21 with the torque converter case 14 and there is provided with the lock-up clutch plate 22b between both clutch drums 20a, 22a. The damper unit 21 is provided around the outer periphery of the lock-up clutch plate 22b. Further, the lock-up clutch piston 22c for engaging and disengaging the lock-up clutch plate 22b is fitted slidably in the axial direction to the inner periphery of the forward clutch drum 20a and also fitted slidably in the axial direction to the forward clutch piston 20c. The rotation center of the lock-up clutch piston 22c is fitted slidably in the axial direction to the pulley input shaft 3b.

As shown in FIG. 2, the forward clutch drum 20a is connected at the open end thereof with an extended portion having bores through which the lock-up clutch piston 22c pushes the lock-up clutch plate 22b.

Further, the primary pulley 3a of the continuously variable transmission 3 which is mounted on the pulley input shaft 3b is interlocked through a belt 3d with a secondary pulley 3c and a pulley output shaft 3e mounting the secondary pulley 3c is connected through a reduction gear set 23a of a final reduction gear unit 23 with a differential 23b for driving a front or rear drive shaft 24.

A primary hydraulic pressure is supplied to a primary oil chamber 3f provided in the primary pulley 3a to determine a groove width of the primary pulley 3a. Further, a secondary hydraulic pressure is supplied to a secondary oil chamber 3g provided in the secondary pulley 3c to produce a tension required for torque transmission in the belt 3d. The primary and secondary hydraulic pressures are established respectively by a transmission control unit (TCU, not shown) based on engine operating conditions. Thus, a desired reduction ratio is obtained in reverse proportion to the groove widths of both pulleys 3a, 3c.

Next, an operation of thus constituted continuously variable automatic transmission will be described.

When the engine 10 starts, the engine power is transmitted to the pump impeller 15a of the torque converter 15 through the fixed plate 13 connected with the crank shaft 10a and the torque converter case 14. The turbine runner 15b opposite to the pump impeller 15a receives the power through the working fluid. On the other hand, the working fluid is returned to the pump impeller 15a after being straightened by the stator 15c.

When the select lever is positioned at "N" (neutral) or "P" (parking) ranges, since the brake plate 19b of the reverse brake 19, the forward clutch plate 20b of the forward clutch 20 and the lock-up clutch plate 22b of the lock-up clutch 22, are all in the released condition, the planetary gear 17 and the planetary carrier 17c of the forward and reverse changeover apparatus 16 idle and as a result the power is never transmitted to the continuously variable transmission 3.

Further, when the select lever is positioned at a forward range such as "D" (drive)range, hydraulic pressure is supplied to the forward clutch operating chamber 20d formed between the lock-up clutch piston 22c and the forward clutch piston 20c. Then, the lock-up clutch piston 22c travels backward (in the right hand direction in FIG. 2) until the stopper 22e contacts with the pulley input shaft 3b. When the stopper 22e is blocked by the pulley input shaft 3b, the lock-up clutch piston 22c stops traveling and then the hydraulic pressure pushes the forward clutch piston 20c in the left hand direction against the biasing force of the return spring 20f to engage the forward clutch plate 20b.

Since the forward clutch plate 20b is provided between the forward clutch drum 20a and the planetary carrier 17c of the planetary gear 17, the planetary carrier 17c is interlocked with the forward clutch drum 20a. As a result, the driving force is transmitted from the turbine runner 15b through this forward clutch drum 20a to the pulley input shaft 3b connected with the primary pulley 3a and thus the continuously variable transmission 3 rotates in the forward direction.

When the lock-up operating condition is satisfied during forward running, a hydraulic pressure is supplied to the lock-up operating chamber 22d formed between the forward clutch drum 20a and the lock-up clutch piston 22c of the lock-up clutch 22 and the lock-up clutch piston 22c operates so as to engage the lock-up clutch plate 22b. On the other hand, at the same time, the hydraulic pressure in the forward clutch operating chamber 20d is drained and as a result the forward clutch piston 20c is pushed back in the right hand direction by the biasing force of the return spring 20f to release the forward clutch plate 20b.

The lock-up clutch plate 22b is provided between the lock-up clutch drum 22a which is connected through the damper unit 21 with the torque converter case 14 and the forward clutch drum 20a and therefore the engine power from the engine 10 is transmitted directly to the pulley input shaft 3b without going through the working fluid of the torque converter 15. This condition is referred to as a "lock-up condition".

In this case, since the lock-up operating chamber 22d is connected with a dedicated hydraulic circuit, not only the lock-up clutch can be changed over from the engagement condition to the release condition and vise versa with a good responsibility, but also the operating pressure thereof can be established precisely. Therefore, a so-called slip control can be performed relatively easily, this largely contributing to a reduction of vibrations and noises due to the fluctuations in the engine speed.

When the select lever is positioned at "R" (reverse) range, the hydraulic pressure supplied to the forward clutch operating chamber 20d and the lock-up clutch operating chamber 22d is drained to release the forward clutch plate 20b and the lock-up clutch plate 22b. At the same time, the brake piston 19c of the reverse brake 19 operates to engage the brake plate 19b.

Then, the ring gear 17b of the planetary gear 17 is fixed and the planetary pinion 17d is revolved by the planetary carrier 17c so as to produce a reverse driving force in the sun gear 17a. As a result, the reverse driving force is transmitted to the pulley input shaft 3b through the sun gear 17a.

Thus constituted transmission provides several dimensional and functional advantages.

Firstly, since the torque converter 15, the forward and reverse changeover apparatus 16 and the lock-up clutch 22 are accommodated in the torque converter case 14, the overall width Wt of the transmission can be reduced. In particular, since the component parts of the forward clutch mechanism and those of the lock-up clutch mechanism are arranged on approximate the same plane expanding in the radial direction of the pulley input shaft, the axial length of the forward and reverse changeover apparatus 16 can be shortened.

Further, this provides a reduction of the number of components. For example, the side wall of the lock-up clutch piston 22c is used as a side wall of the forward clutch operating chamber 20d. Further, the forward clutch drum 20a is employed also as a power transmission member when the lock-up clutch 22 is engaged.

Further, since the damper unit 21 is arranged in the radial direction of the lock-up clutch plate 22b, an increase of the width due to the damper unit 21 can be minimized.

Further, since a dedicated hydraulic circuit is connected to the lock-up operating chamber 22d, the lock-up clutch can be operated with good response and the hydraulic pressure can be controlled precisely, this enabling a so-called slip control of the lock-up clutch.

Figure 3:
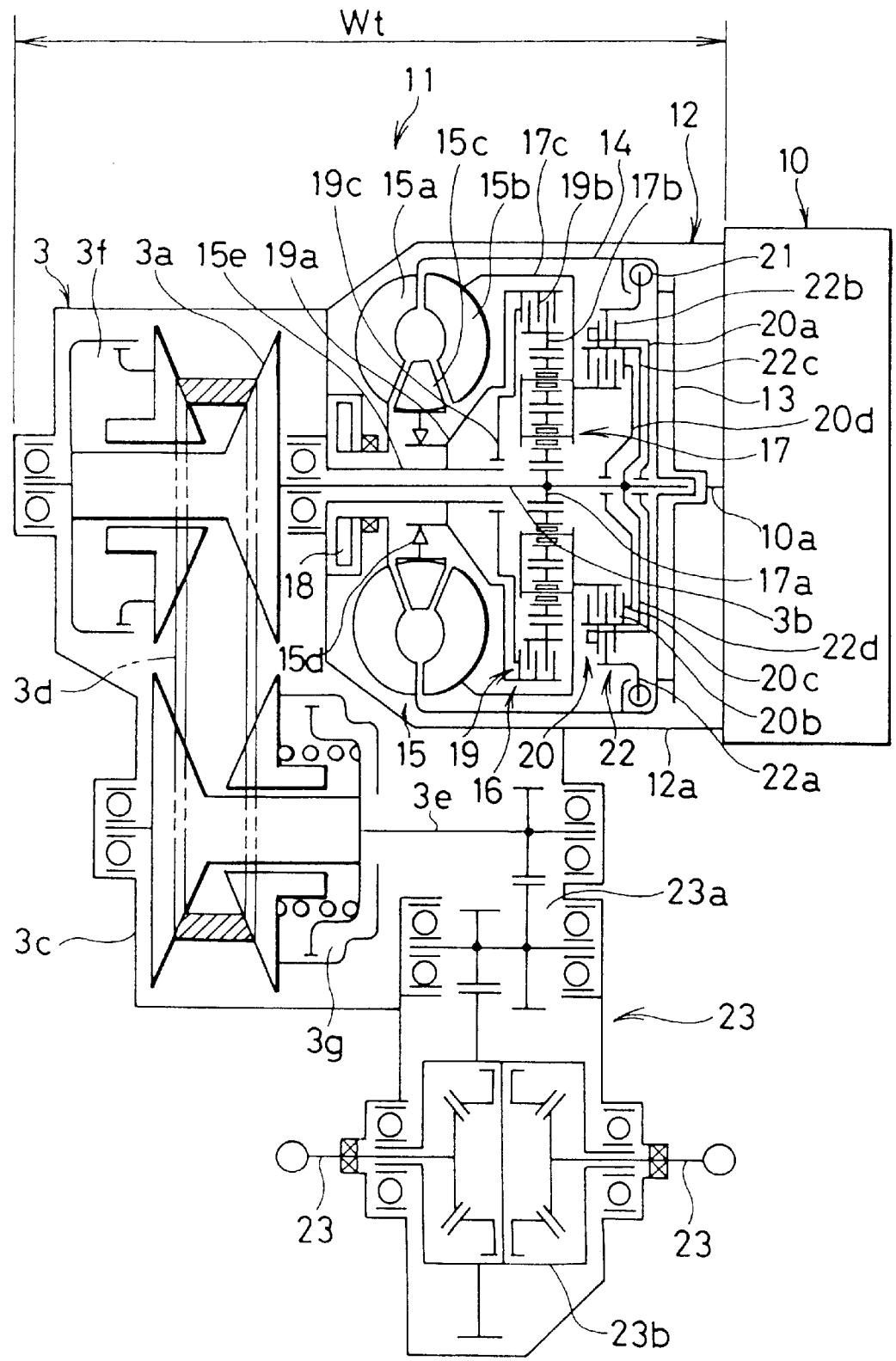
FIG. 3 is a schematic view showing an automatic transmission according to a second embodiment of the present invention.
Figure 4:
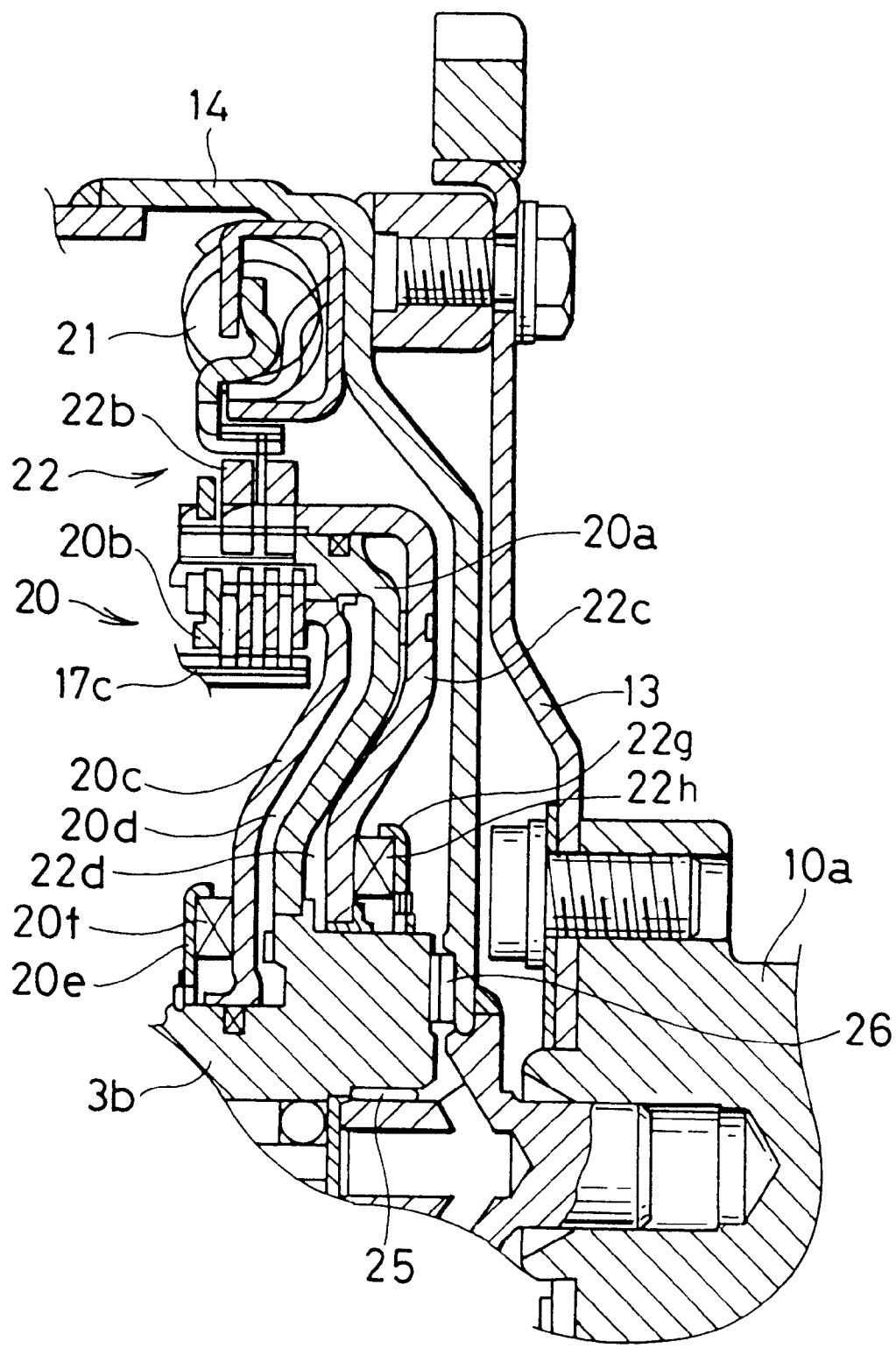
FIG. 4 is an enlarged fragmentary sectional view showing an operating mechanism of a lock-up clutch according to a second embodiment.
Figure 5:
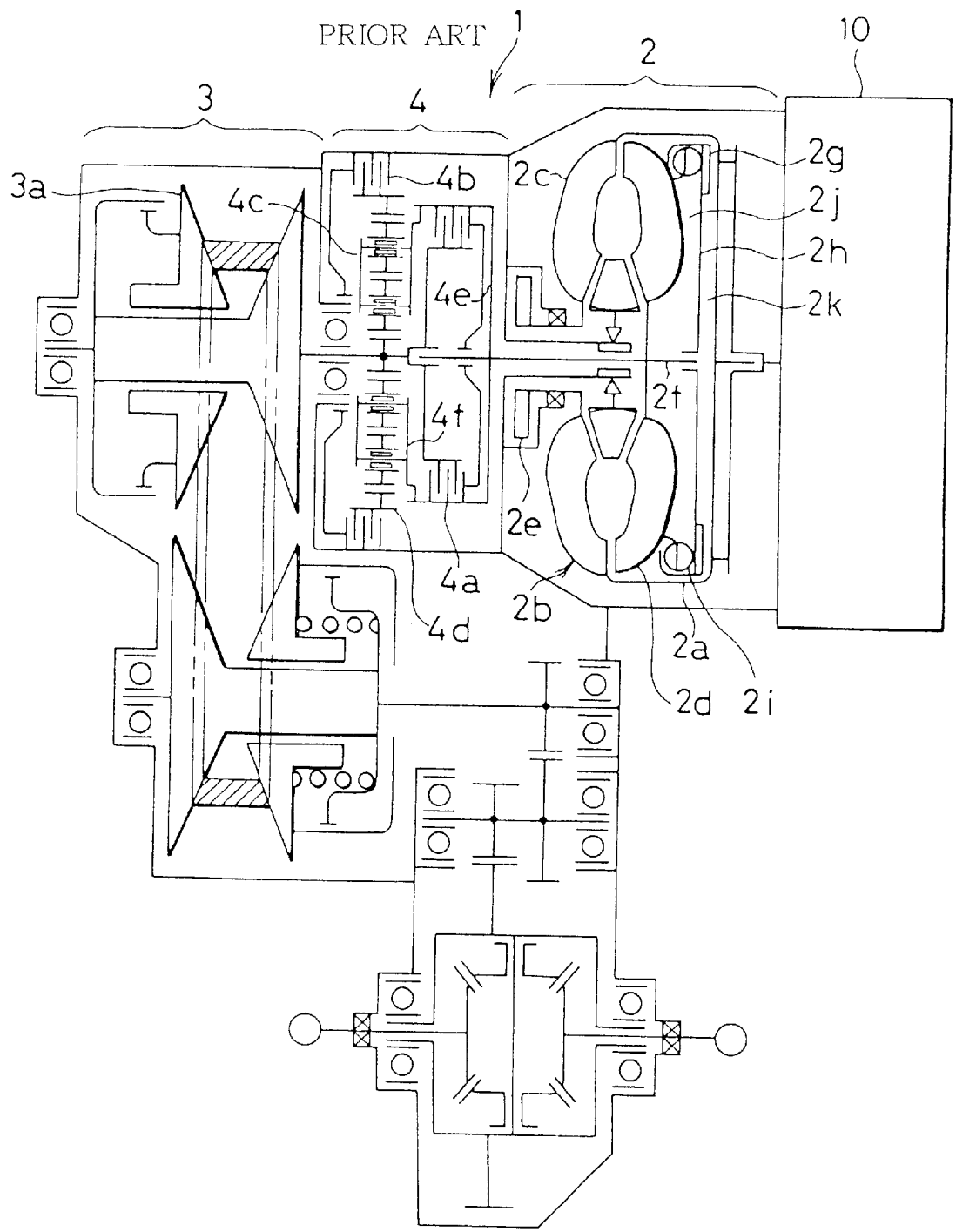
FIG. 5 is a schematic view showing an automatic transmission according to a prior art.
Figure 6:
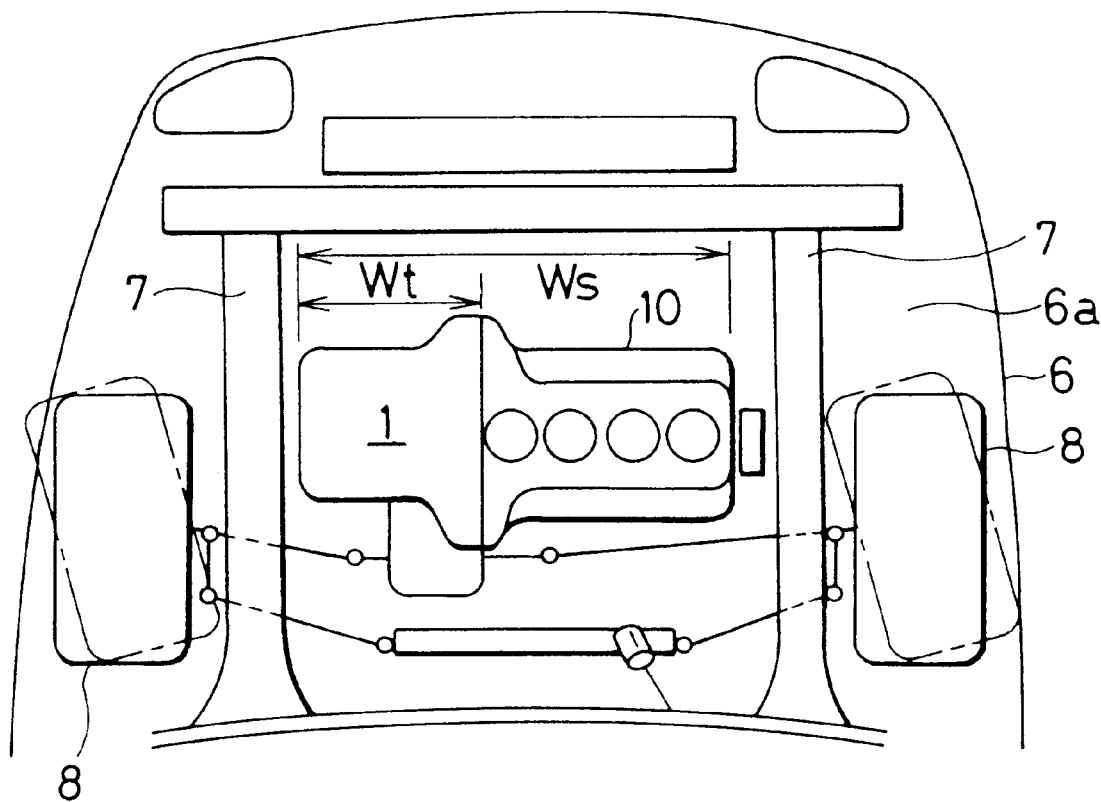
FIG. 6 is a schematic plane view showing a layout of an automatic transmission integrally coupled with an engine arranged transversely in an engine room.

FIG. 3 and FIG. 4 show a second embodiment of the present invention. In the first embodiment, the lock-up clutch piston 22c is provided between the forward clutch piston 20c and the forward clutch drum 20a, however in the second embodiment, the lock-up clutch piston 22c is provided outside of the forward clutch drum 20a.

When the select lever is positioned at "D" range, a hydraulic pressure is supplied to the forward clutch operating chamber 20d formed between the forward clutch piston 20c and the forward clutch drum 20a. The rotational center of the forward clutch piston 20c is slidably fitted to the pulley input shaft 3b through a sealing member. Further, the outer periphery of the forward clutch piston 20c is slidably fitted to the inner periphery of the forward clutch drum 20a through a sealing member. When the hydraulic pressure in the forward clutch operating chamber 20d becomes higher than the biasing force of the return spring 20f, the forward clutch piston 20c travels in the left hand direction in FIG. 4 while it is supported by both sliding faces to engage the forward clutch plate 20b.

As a result, the driving force from the planetary carrier 17c is transmitted to the pulley input shaft 3b through the forward clutch plate 20b and the forward clutch drum 20a.

Further, when the lock-up condition is satisfied, the hydraulic pressure in the forward clutch operating chamber 20d is drained to release the forward clutch plate 20b of the forward clutch 20 and at the same time a hydraulic pressure is supplied to the lock-up operating chamber 22d formed between the forward clutch drum 20a and the lock-up clutch piston 22c.

The rotational center of the lock-up clutch piston 22c is slidably fitted to the pulley input shaft 3b through a sealing member and further the inner periphery thereof is slidably fitted to the outer periphery of the forward clutch drum 20a through a sealing member. Further, there is provided with a spring retainer 22g which is connected to the pulley input shaft 3b on the opposite side of the forward clutch drum 20a and there is provided with a return spring 22h for biasing the lock-up clutch piston 22c in the releasing direction between the lock-up clutch piston 22c and the retainer 22g.

When the hydraulic pressure in the lock-up operating chamber 22d becomes higher than the biasing force of the return spring 22h, the lock-up clutch piston 22c travels in the right hand direction in FIG. 4 while it is supported by both sliding faces.

The open end of the lock-up clutch piston 22c is shaped like comb teeth and the lock-up clutch plate 22b has holes through which the comb teeth pass. The end of the comb teeth is shaped like hooks with which the lock-up clutch plate 22b is pushed. Further, the damper unit 21 is provided between the torque converter case 14 and the lock-up clutch drum 22a around the outer periphery of the lock-up clutch plate 22b in the same manner as the first embodiment.

When the lock-up clutch piston 22c travels in the right hand direction in FIG. 4, the hooks push the lock-up clutch plate 22b to be engaged.

When the lock-up clutch plate 22b is engaged, the driving force from the engine 10 is transmitted directly to the pulley input shaft 3b without going through the fluid via the torque converter case 14, the damper unit 21, the lock-up clutch drum 22a, the lock-up clutch plate 22b and the forward clutch drum 20a.

According to the second embodiment, the forward clutch piston 20c is provided inside of the forward clutch drum 20a and the lock-up clutch piston 22c is provided outside of the forward clutch drum 20a. That is, the forward clutch piston 20c and the lock-up clutch piston 22c are slidably supported by the forward clutch drum, respectively. Further, the forward clutch operating chamber 20d and the lock-up operating chamber 22d are formed independently on the both sides of the forward clutch drum 20a.

Thus, in the same manner as in the first embodiment, the component parts of the forward clutch mechanism and those of the lock-up clutch mechanism are arranged on approximate the same plane expanding in the radial direction of the pulley input shaft, the axial length of the forward and reverse changeover apparatus can be shortened.

The transmission according to the present invention may be a conventional gear type transmission in place of the continuously variable type transmission.

In summary, according to the present invention, the torque converter, the forward and reverse changeover apparatus, the lock-up clutch and the damper unit are integrally accommodated in the torque converter case, the overall width of the automatic transmission can be reduced. Further, since the forward clutch plate, the lock-up clutch plate and the damper unit are arranged on approximately the same plane expanding in the radial direction with respect to the input shaft connected to the automatic transmission, these components can be accommodated compactly in the torque converter case.

Further, since the lock-up clutch piston and the forward clutch piston are provided in the forward clutch drum or the forward clutch piston and the lock-up clutch piston are arranged with the forward clutch drum between, the integration of components can be achieved, this leading to the reduction of component parts of the transmission.

Further, since the forward clutch drum forms a common driving force transmitting member, the number of component parts can be realized.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic transmission mounted on a vehicle having an engine, a torque converter, a torque converter case for accommodating said torque converter, a transmission and an input shaft for connecting said torque converter with said transmission, comprising:
    a forward and reverse changeover apparatus accommodated in said torque converter case; and
    a lock-up clutch accommodated in said torque converter case.

2. The automatic transmission according to claim 1, wherein
    said forward and reverse changeover apparatus is provided between said torque converter and said lock-up clutch and said lock-up clutch is provided between said forward and reverse changeover apparatus and said engine.

3. An automatic transmission mounted on a vehicle having an engine, a torque converter, a torque converter case for accommodating said torque converter, a transmission, an input shaft for connecting said torque converter with said transmission, a forward and reverse changeover apparatus including a planetary gear, a planetary carrier and a reverse brake, comprising:
    a lock-up clutch provided between said forward and reverse changeover apparatus and said engine; and
    a forward clutch arranged side by side with said lock-up clutch in the radial direction with respect to said input shaft and provided between said forward and reverse changeover apparatus and said engine.

4. An automatic transmission mounted on a vehicle having an engine, a torque converter, a torque converter case for accommodating said torque converter, a transmission, an input shaft for connecting said torque converter with said transmission, a forward and reverse changeover apparatus including a planetary gear, a planetary carrier and a reverse brake, comprising:
    a forward clutch drum connected with said input shaft;
    a forward clutch plate provided between said forward clutch drum and said planetary carrier;
    a lock-up clutch drum connected with said torque converter case;
    a lock-up clutch plate provided between said forward clutch drum and said lock-up clutch drum;
    a lock-up clutch piston slidably fitted to said input shaft for engaging and releasing said lock-up clutch plate and provided inside of said forward clutch drum between said forward clutch drum and said forward and reverse changeover apparatus;
    a forward clutch piston slidably fitted to said input shaft for engaging and releasing said forward clutch plate and provided inside of said forward clutch drum between said lock-up clutch piston and said forward and reverse changeover apparatus;
    a first pressure chamber provided between said forward clutch piston and said lock-up clutch piston for operating said forward clutch piston; and
    a second pressure chamber provided between said lock-up clutch piston and said forward clutch drum for operating said lock-up clutch piston.

5. An automatic transmission mounted on a vehicle having an engine, a torque converter, a torque converter case for accommodating said torque converter, a transmission, an input shaft for connecting said torque converter with said transmission, a forward and reverse changeover apparatus including a planetary gear, a planetary carrier and a reverse brake, comprising:
    a forward clutch drum connected with said input shaft;
    a forward clutch plate provided between said forward clutch drum and said planetary carrier;
    a lock-up clutch drum connected with said torque converter case;
    a lock-up clutch plate provided between said forward clutch drum and said lock-up clutch drum;
    a lock-up clutch piston slidably fitted to said input shaft for engaging and releasing said lock-up clutch plate and provided outside of said forward clutch drum between said forward clutch drum and said torque converter case;
    a forward clutch piston slidably fitted to said input shaft for engaging and releasing said forward clutch plate and provided inside of said forward clutch drum between said forward clutch drum and said forward and reverse changeover apparatus;
    a first pressure chamber provided between said forward clutch piston and said forward clutch drum for operating said forward clutch piston; and
    a second pressure chamber provided between said lock-up clutch piston and said forward clutch drum for operating said lock-up clutch piston.

6. The automatic transmission according to claim 4, wherein
    said forward clutch plate is arranged on the inner periphery of said forward clutch drum and said lock-up clutch plate is arranged on the outer periphery of said forward clutch drum.

7. The automatic transmission according to claim 5, wherein said forward clutch plate is arranged on the inner periphery of said forward clutch drum and said lock-up clutch plate is arranged on the outer periphery of said forward clutch drum.

8. The automatic transmission according to claim 4, wherein said lock-up clutch drum is connected with said torque converter case through a damper unit and said damper unit is arranged on the outer periphery of said lock-up clutch plate through said lock-up clutch drum.

9. The automatic transmission according to claim 5, wherein said lock-up clutch drum is connected with said torque converter case through a damper unit and said damper unit is arranged on the outer periphery of said lock-up clutch plate through said lock-up clutch drum.

* * * * *